United States Patent Office 3,706,022
Patented Dec. 12, 1972

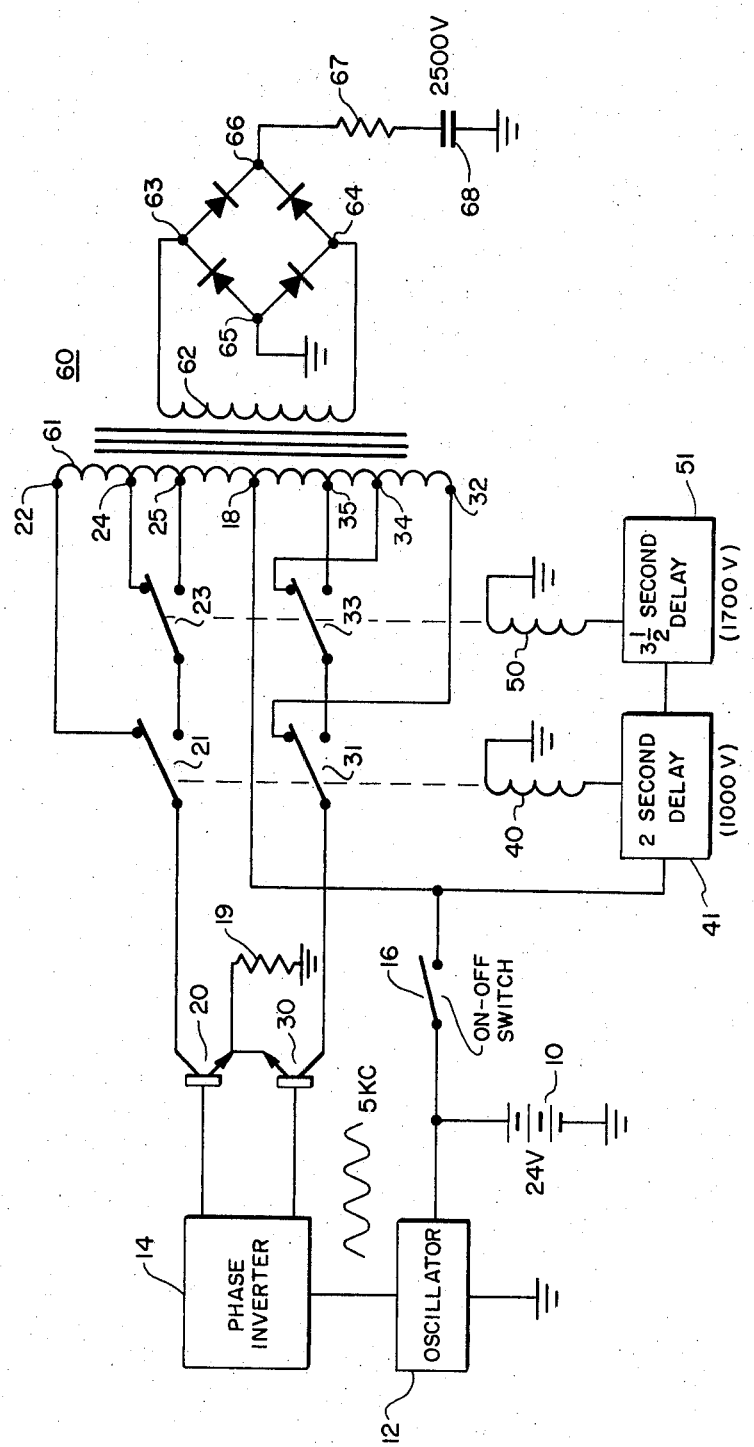

3,706,022
HIGH EFFICIENCY CAPACITOR CHARGING CIRCUIT
Earl E. Corey, Waltham, Richard A. Tuft, Chelmsford, and Jason H. Woodward, Lexington, Mass., assignors to the United States of America as represented by the Secretary of the Army
Continuation of abandoned application Ser. No. 15,655, Mar. 2, 1970. This application Nov. 4, 1971, Ser. No. 195,887
Int. Cl. H02m 3/24
U.S. Cl. 320—1          2 Claims

ABSTRACT OF THE DISCLOSURE

This disclosure relates to charging circuits and, particularly, to circuits for converting D-C voltage from a low level to a high level for capacitor charging. More particularly this disclosure describes a circuit for converting a low-level, D-C voltage to a high-level, D-C, capacitor-charging voltage in a series of steps of increasing voltage to maintain a relatively-high rate of charge and efficiency during the entire charging time from zero voltage to the full voltage.

---

This is a continuation of application Ser. No. 15,655, filed Mar. 2, 1970, now abandoned.

BACKGROUND OF THE INVENTION

Conversion circuits are well known and usually comprise a source of low-voltage, alternating current, or an oscillator—or chopper—means for converting a direct current to a low-voltage, alternating current. The low-voltage, alternating current is passed through a transformer to produce higher-voltage, alternating current, which is rectified in a normal way to produce a high-voltage, direct current. The current available at the high voltage is, of course, inversely proportional to the current supplied at the low voltage input.

In the case of capacitor charging, the charging voltage must be high enough to achieve the ultimate capacitor charge—with, inevitably, a minimum charging current and a relatively high source impedance—however, the charging voltage is initially applied across a discharged capacitor at substantially zero voltage level. This represents an effective short circuit across the charging circuit. If the capacitor has a very-high capacity, and the charging current available at the high voltage is limited, the effective short circuit will continue for a substantial time. Also, it is axiomatic that if a circuit is designed to provide a high voltage at the maximum efficiency, it must be inefficient at low voltages and vice versa. This represents a very poor and inefficient energy transfer, if not a serious overload on the D-C source.

One system for protecting the high-voltage, D-C source from potential damage due to extended, short-circuit conditions is to use a limiting resistor. This holds the maximum charging current to a safe level but delays the charging time. Also, this puts the full voltage of the D-C source across the limiting resistor during the initial portion of the charging cycle, with predictable and inescapable losses.

It is therefore an object of this invention to provide an improved voltage-converting circuit for capacitor charging.

It is a further object of this invention to provide an improved voltage-converting circuit that will raise the voltage on a charging capacitor from a low level to a high level in a relatively short time.

It is a further object of this invention to provide a D-C voltage-conversion circuit that will charge a capacitor from a low voltage to a very-high voltage in a relatively short time and that will be operating at a relatively-high efficiency during the entire charging cycle.

SUMMARY OF THE INVENTION

A low-voltage source of direct current supplies power to an oscillator to produce alternating current, which is fed to a transformer through a series of switches that connect to taps on the primary of the transformer to change the turns ratio between the primary and the secondary windings of the transformer. The secondary winding is connected through a rectifying device and a suitable limiting resistor to the capacitor to be charged.

The switches are initially set to provide a high, primary-to-secondary, turns ratio at the beginning of the charge to supply a low voltage and high current to the initially-discharged capacitor. As the voltage on the capacitor increases, the switches are actuated through relays to provide lower, primary-to-secondary ratios and higher voltages at optimum charging currents to the charging capacitor until the desired, maximum voltage is reached.

BRIEF DESCRIPTION OF THE DRAWING

The drawing shows a circuit diagram of the essential parts of the circuit with the conventional elements included in block diagram form.

DETAILED DESCRIPTION OF THE PREFERRED EMBODIMENT

In the drawing, a relatively-low voltage supply 10 supplies power to an oscillator 12 which generates an alternating current signal that is applied to a phase inverter 14 which drives the base electrodes of a pair of push-pull connected output transistor 20 and 30.

The collector electrodes of the push-pull output transistors are connected through a series of switches to taps on the primary winding 61 of an output transformer 60. The emitter terminals of these transistors are connected to ground through a common, biasing resistor 19. The secondary winding 62 of the output transformer is connected to opposing terminals 63 and 64 of a bridge rectifier whose other terminals 65 and 66 are connected between ground and a capacitor 68, that is to be charged, through a limiting resistor 67.

The switches 21–23 and 31–33 between the push-pull output transistors and the primary winding 61 of the transformer, initially connect the collector electrodes of the transistors to the primary winding taps 22 and 32 with the maximum number of turns. When the first pair of switches 21 and 31 are actuated, they connect the output of the push-pull transistors to another pair of primary winding taps 24 and 34 to provide a fewer number of turns. Lastly, when a second pair of switches 23 and 33 are actuated, the push-pull output transistors are connected to the primary winding taps 25 and 35 that provide the minimum number of turns. The first pair of switches 21 and 31 are actuated by the relay coil 40 which is energized by a two-second delay unit 41 and the second pair of switches 23 and 33 are actuated by the relay coil 50 which is energized by a three and a half second delay unit 51.

Both of these delay units are, initially, energized along with the push-pull output transistors, when the on-off switch 16 is closed.

In operation, the oscillator supplies an A-C signal to a phase inverter which supplies signals of opposite phase to the base-electrode inputs of the push-pull connected transistors 20 and 30. When the on-off switch 16 is turned on, the collector electrodes of the transistors are, initially, connected to the low-voltage supply 10 through the switches to the push-pull taps 22 and 32, with the maximum primary windings. This provides the maximum turns ratio of primary-to-secondary, which gives the minimum voltage and the maximum current through the bridge rectifier to the capacitor 68. This provides a rapid charge of the capacitor up to a first voltage level—in this case in the order of 1000 volts—which is reached in about two seconds after the closing of the on-off switch 16.

As the peak voltage of the first charging level is approached, the charging current starts to taper off. However the on-off switch also actuates the two second delay unit 41 which now energizes the relay coil 40 that closes the switches 21 and 31.

The switches 21 and 31 now connect the collector electrodes of the push-pull output transistors, through the switches 23 and 33, respectively, to the taps 24 and 34, with fewer turns of push-pull primary windings than 22 and 32, to provide a lower primary-to-secondary turns ratio which produces a higher voltage across the output winding 62 and to the rectifiers and charging capacitor. This continues the charging of the capacitor 68 at an optimum rate until it approaches a second level of voltage across the output terminals—in this case in the order of 1700 volts—after three and a half seconds, or a total of five and a half seconds after the closing of the on-off switch.

As the second voltage level is approached, the charging current again starts to taper off. However, the second delay unit 51 also functions at this time to energize the coil 50, which closes the switches 23 and 33 to connect the collector electrodes of the output transistors to the taps 25 and 35 on the push-pull windings of the output transformer which provide the minimum primary-to-secondary turns ratio and the maximum voltage across the secondary, to continue the charging of the capacitor 68, at an optimum rate, to the maximum value—in this case in the order of 2500 volts—which is maintained until the on-off switch is disconnected and the condenser is discharged again.

It should be noted that, while the capacitor could be charged up to the full 2500 volts by the continued action of the full 2500 volts across the secondary of the output transformer, the available current at the full voltage, and the efficiency of the circuit with the output transformer effectively short-circuited during the early stages of charge would make the time of the charge to the 1000 voltage level as well as to the 1700 volt level considerably more than can be realized with an initial output voltage of lower value and a correspondingly higher current. On the other hand, the level of output voltage must, ultimately, be sufficient to charge the capacitor to the maximum desired voltage. Both of these requirements are met by this invention.

Although a push-pull system has been shown here and has well known advantages of efficiency and effective power ratings for a given size transistor, it is apparent that a single-sided output system could be used with single switches instead of double switches connecting corresponding, single-sided primary-winding taps at the correct times.

It is also obvious that a single phase rectifier or two phase rectifier could be used with well known changes in wiring and predictable differences in operation.

It should also be noted that the switching of voltage could be from taps in the secondary, output windings of the transformer instead of in the input windings, with the effect of the switching being reversed; that is to say, from a minimum number of secondary turns at the early stages of the charging to the maximum number of turns for the final stages of the charging. This would result in predictable differences of voltage and current, and changes in the switching requirements to accommodate any problems with arcing and so forth.

The actual charging of the capacitor at any voltage level is a function of the low-level input voltage, which, along with other circuit criteria, can change the charging rate. If the charging rate should change, the optimum level for the switching of any given step in the charging sequence could be reacted sooner or later then the time suggested. In such a case, the time delay units for actuating the switching relays could be replaced by voltage-sensitive relays to switch to the higher charging voltage as soon as the charging rate at one voltage begins to decline.

The charging rate at any voltage will, of course, follow familiar, classical, asymptotic curves and keep decreasing as it approaches the maximum level for a given voltage. The charging rate at a lower voltage must, at some time or voltage level, fall below the charging rate of the next higher level. Technically the charging voltage should be switched to a higher level at the time—or voltage level—whereat the charging rate at the higher voltage would be faster than the charging rate at the lower voltage.

Many minor variations can be made in the circuit by one skilled in the art. For instance, the oscillator could be switched on and off along with the charging circuit to save current between charges. The device must be switched off, manually or automatically, every time the capacitor is discharged, to repeat the cycle of optimum charging voltages.

The waveform of the oscillator may be anything from the sine wave shown to a square wave, with corresponding voltage patterns across the output of the charging circuit and minor, but sometimes significant, changes in the efficiency or the smoothness of charging of the overall circuit.

The frequency of the oscillator is shown as five kilocycles although it will be apparent that this charging circuit will function at almost any frequency at which a converter and transformer can operate efficiently. The frequency of the oscillator should be the most efficient possible for the transformer or vice versa.

What is claimed is:

1. A capacitor charging circuit for charging a capacitor from a direct current supply of low terminal voltage to a voltage many times higher than the terminal voltage efficiently and rapidly comprising a step-up transformer having a primary and secondary, each having end terminals, rectifier means connected in circuit with the end terminals of the secondary and having circuit connections for a capacitor to be charged for delivering unidirectional current from the secondary to the capacitor, said primary having a center tap and at least one pair of intermediate taps that are symmetrical relative to the center tap, conductor means including an on-off switch for connecting the center tap to a direct current supply, means for delivering two balanced AC outputs that are 180 degrees out of phase relative to the center tap, relay-controlled switch means having two operating states for coupling the AC outputs to the end terminals of the primary in one of its two operating states and for coupling the AC outputs to the intermediate taps of the primary in the other of its operating states, time-delay means connected between the on-off switch and the relay and operable a predetermined time interval after the on-off switch has been close-circuited to operate the relay to switch the AC outputs from the primary end terminals to the primary intermediate terminals, whereby when a direct current supply is connected to the on-off switch and to the means for delivering two AC outputs, and a capacitor to be charged is connected in circuit with said rectifier means, and said on-off switch is closed, said capacitor is charged at a relatively high-current low-voltage rate until said relay is actuated and then said capacitor is charged at a higher-voltage lower-current rate.

2. A capacitor charging circuit as defined in claim 1 further including a low-power direct current supply connected to said on-off switch and to said means for delivering two AC outputs.

References Cited
UNITED STATES PATENTS

| | | | |
|---|---|---|---|
| 2,507,022 | 5/1950 | Languepin | 320—1 |
| 3,350,620 | 10/1967 | Barron | 321—2 |

GERALD GOLDBERG, Primary Examiner

U.S. Cl. X.R.

307—109; 321—2